United States Patent
Garmark et al.

(10) Patent No.: US 11,330,348 B2
(45) Date of Patent: *May 10, 2022

(54) METHODS, COMPUTER SERVER SYSTEMS AND MEDIA DEVICES FOR MEDIA STREAMING

(71) Applicant: Spotify AB, Stockholm (SE)

(72) Inventors: Sten Garmark, Stockholm (SE); Lisa Brännfors, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/108,812

(22) Filed: Dec. 1, 2020

(65) Prior Publication Data
US 2021/0120318 A1   Apr. 22, 2021

Related U.S. Application Data

(63) Continuation of application No. 16/207,813, filed on Dec. 3, 2018, now Pat. No. 10,887,671.

(30) Foreign Application Priority Data

Dec. 12, 2017   (EP) .................................... 17206825

(51) Int. Cl.
*H04N 21/845* (2011.01)
*H04L 29/06* (2006.01)
(Continued)

(52) U.S. Cl.
CPC ... *H04N 21/8456* (2013.01); *H04L 29/06448* (2013.01); *H04L 29/06462* (2013.01);
(Continued)

(58) Field of Classification Search
CPC ... H04L 29/06448–0651; H04L 65/4069–607; H04N 21/43–43072;
(Continued)

(56) References Cited

U.S. PATENT DOCUMENTS 6,525,775 B1 *   2/2003   Kahn ................. H04N 21/8166
                                                       348/460
7,900,145 B2 *   3/2011   Blinnikka ............. G06F 3/0481
                                                       715/719
(Continued)

OTHER PUBLICATIONS

Garmark, Office Action, U.S. Appl. No. 16/207,813, dated Apr. 30, 2020, 12 pgs.
(Continued)

*Primary Examiner* — Brendan Y Higa
(74) *Attorney, Agent, or Firm* — Morgan, Lewis & Bockius LLP

(57) ABSTRACT

In general, this disclosure concerns media streaming. Among other things, the present disclosure presents a first media item for streaming from a computer server system to a media device. The first media item has an audio format. Furthermore, the first media item comprises a number of media segments, wherein each one of the number of media segments is identifiable by a media segment identifier. Still further, one or several of the number of media segments is/are associated with a respective second media item corresponding to a respective media segment identifier. The second media item(s) typically has/have a media format other than audio.

15 Claims, 6 Drawing Sheets

(51) Int. Cl.
*H04N 21/472* (2011.01)
*H04N 21/439* (2011.01)
*H04N 21/41* (2011.01)
*H04N 21/43* (2011.01)
*H04N 21/2368* (2011.01)
*H04N 21/4722* (2011.01)
*H04L 65/60* (2022.01)
*H04L 65/61* (2022.01)
*H04L 65/612* (2022.01)

(52) U.S. Cl.
CPC ...... *H04L 65/4069* (2013.01); *H04L 65/4084* (2013.01); *H04L 65/60* (2013.01); *H04N 21/2368* (2013.01); *H04N 21/41265* (2020.08); *H04N 21/4307* (2013.01); *H04N 21/439* (2013.01); *H04N 21/43072* (2020.08); *H04N 21/472* (2013.01); *H04N 21/4722* (2013.01); *G10H 2240/036* (2013.01); *G10H 2240/325* (2013.01)

(58) Field of Classification Search
CPC .... H04N 21/4722; H04N 21/845–8456; G10L 19/167; G10H 2240/036; G10H 2240/325
See application file for complete search history.

(56) References Cited

U.S. PATENT DOCUMENTS

| | | | | |
|---|---|---|---|---|
| 8,143,508 B2 * | 3/2012 | Jean | ...................... | G10H 1/365 84/600 |
| 8,433,431 B1 * | 4/2013 | Master | ................. | G10H 1/0008 700/94 |
| 8,917,971 B2 * | 12/2014 | Woods | ................. | H04N 21/478 386/200 |
| 9,176,658 B1 * | 11/2015 | Latin-Stoermer | ..... | G06F 3/0485 |
| 9,305,530 B1 * | 4/2016 | Durham | ................. | G10L 25/27 |
| 9,578,392 B2 * | 2/2017 | Abecassis | ........ | H04N 21/47217 |
| 9,723,366 B2 * | 8/2017 | Voris | ................. | H04N 21/4722 |
| 9,848,228 B1 * | 12/2017 | Morris | ................. | H04N 5/9265 |
| 9,961,386 B1 * | 5/2018 | Thomas | ............ | H04N 21/6125 |
| 10,887,671 B2 * | 1/2021 | Garmark | ............ | H04N 21/4307 |
| 2002/0154694 A1 * | 10/2002 | Birch | ............... | H04N 21/23608 375/240.05 |
| 2002/0184339 A1 * | 12/2002 | Mackintosh | ........... | H04H 20/02 709/218 |
| 2004/0266337 A1 * | 12/2004 | Radcliffe | .............. | G10H 1/0008 455/3.06 |
| 2006/0168507 A1 * | 7/2006 | Hansen | .............. | H04N 21/4307 715/202 |
| 2007/0011279 A1 * | 1/2007 | Haklai | .................. | G06F 16/433 709/219 |
| 2007/0166683 A1 * | 7/2007 | Chang | .................. | G09B 21/009 434/307 R |
| 2007/0196802 A1 * | 8/2007 | Beletski | ................. | G09B 7/00 434/323 |
| 2007/0250901 A1 * | 10/2007 | McIntire | ............ | H04N 21/8586 725/146 |
| 2009/0083281 A1 * | 3/2009 | Sarig | ....................... | G11B 27/11 |
| 2010/0042682 A1 * | 2/2010 | Kaye | ...................... | G11B 27/34 709/203 |
| 2010/0110072 A1 | 5/2010 | Nakayama | | |
| 2010/0145708 A1 * | 6/2010 | Master | ............... | G06Q 30/0273 704/270 |
| 2010/0306402 A1 * | 12/2010 | Russell | ........... | H04N 21/47205 709/231 |
| 2011/0096073 A1 * | 4/2011 | Adhikari | ............... | G06T 15/005 345/426 |
| 2011/0209224 A1 * | 8/2011 | Gentile | .................... | G06F 21/10 726/27 |
| 2011/0231869 A1 * | 9/2011 | Scheirey | ................ | H04N 7/173 725/16 |
| 2012/0059947 A1 * | 3/2012 | Mountain | .......... | H04N 21/4334 709/231 |
| 2012/0259926 A1 * | 10/2012 | Lockhart | ................ | H04L 51/10 709/206 |
| 2012/0278348 A1 * | 11/2012 | Chardon | ................. | G06F 16/40 707/758 |
| 2013/0070093 A1 * | 3/2013 | Rivera | ................. | H04N 21/439 348/143 |
| 2013/0330062 A1 * | 12/2013 | Meikle | ................... | G11B 27/28 386/285 |
| 2014/0172961 A1 * | 6/2014 | Clemmer | ........... | H04N 21/4307 709/203 |
| 2015/0149326 A1 * | 5/2015 | Corts | .................. | G06F 16/9566 705/27.1 |
| 2015/0339301 A1 * | 11/2015 | Paalborg | ................. | G06F 16/44 715/716 |
| 2016/0073138 A1 | 3/2016 | Francisco et al. | | |
| 2016/0134911 A1 * | 5/2016 | Tetreault | ............ | H04N 21/6543 725/32 |
| 2016/0182600 A1 | 6/2016 | Swaminathan et al. | | |
| 2016/0203112 A1 | 7/2016 | Asamani et al. | | |
| 2016/0249091 A1 * | 8/2016 | Lennon | ............. | H04N 21/4307 |
| 2018/0063572 A1 * | 3/2018 | Smus | ................... | H04N 21/439 |
| 2018/0366097 A1 * | 12/2018 | Sharp | ................. | G06Q 30/0269 |
| 2019/0020905 A1 * | 1/2019 | Bennett | ........... | H04N 21/41407 |
| 2019/0129683 A1 * | 5/2019 | Singh | ................. | G06F 3/04847 |
| 2019/0139577 A1 * | 5/2019 | Schileru | ............... | H04N 21/812 |
| 2019/0244639 A1 * | 8/2019 | Benedetto | ............ | G11B 27/036 |

OTHER PUBLICATIONS

Garmark, Notice of Allowance, U.S. Appl. No. 16/207,813, dated Sep. 3, 2020, 9 pgs.
Spotify AB, Extended European Search Report, EP17206825.6, dated Apr. 6, 2018, 7 pgs.
Spotify AB, communication Pursuant to Article 94(3), EP17206825. 6, dated Mar. 1, 2019, 5 Pgs.
Spotify AB, communication Pursuant to Article 94(3), EP19201350. 6, dated Apr. 9, 2020, 7 pgs.
Spotify AB, communication Pursuant to Article 94(3), EP19201350. 6, dated Sep. 3, 2020, 9 pgs.
Spotify AB, Extended European Search Report, EP19201350.6, dated Oct. 31, 2019, 9 pgs.
Spotify AB, Summons to Attend Oral Proceedings, EP17206825.6, Apr. 9, 2019, 20 pgs.
Spotify AB, Brief Communication Oral Proceedings, EP17206825. 6, Oct. 1, 2019, 10 pgs.

* cited by examiner

METHODS, COMPUTER SERVER SYSTEMS AND MEDIA DEVICES FOR MEDIA STREAMING

RELATED APPLICATIONS

This application is a continuation of U.S. patent application Ser. No. 16/207,813, filed Dec. 3, 2018, entitled, "Methods, Computer Server Systems and Media Devices for Media Streaming," which claims priority to European Patent Application No. EP 17206825.6, filed Dec. 12, 2017, entitled, "Methods, computer Server Systems, and Media Devices for Media Streaming," each of which is hereby incorporated by reference in its entirety.

TECHNICAL FIELD

The present disclosure generally relates to the provision of media, and more particularly to the streaming of media. In particular, the present disclosure presents methods, computer program, computer server systems and corresponding media devices where a first media item having an audio format is streamed from the computer server system to the media device for playback at the media device.

BACKGROUND

As computer technology has improved, the digital media industry has evolved greatly in recent years. Users are able to use media devices such as mobile communication devices (e.g., cellular telephones, smartphones, tablet computers, etc.) to consume media content (e.g., music, videos and other forms of media content). For instance, users can listen to audio content (e.g., music) and/or watch video content (e.g., movies, television (TV) broadcasts, etc.) on a variety of media devices.

At the same time, advances in network technology have increased the speed and reliability with which information can be transmitted over computer networks. It is therefore possible for users to stream media content over computer networks as needed, or on demand, rather than transmitting a complete file in physical media (such as CD or DVD, or downloading the entire file) before consuming the media content.

In today's multimedia environment, much of the focus is primarily on content that is intended for the eyes of a user. Much of the technology development is therefore currently focusing on improving the existing art with respect to delivery and consumption of visual media content such as video content.

SUMMARY

It is in view of the above considerations and others that the various embodiments disclosed herein have been made.

It is a general object of the embodiments described herein to enable a novel user experience when consuming streamed audio content.

This general object has been addressed by the appended independent claims. Advantageous embodiments are defined in the appended dependent claims.

In particular, the present disclosure recognizes the fact that, despite the current trend of focusing on visual media content as described in the background, there is actually a need for a user experience which is primarily focusing on audio content (i.e., media content intended for the ears of user) while, at the same time, enabling the consumption of other different media content, e.g. 'on demand', in an efficient manner.

In a first of its aspects, this disclosure presents a method of streaming a first media item having an audio format to a media device. In other words, the first media item may be an audio item. The method is advantageously, but not necessarily, performed by a computer server system including one or more computer servers.

The first media item is divided into a number of media segments (e.g., several media segments). Each one of the number of media segments is identifiable by a media segment identifier.

One or more second media items to be associated with a respective media segment of the first media item is/are selected. The one or more second media items preferably have a media format other than audio.

The selected one or more second media items are associated with respective media segments of the first media segment.

Furthermore, the selected one or more second media items media items are provided to the media device.

In some embodiments, said media format other than audio includes a visual format. For example, the visual format may include a video format. Additionally, or alternatively, the visual format may include a text format and/or an image format.

As will be appreciated, a media segment of said number of media segments may be a portion of the first media item. Said portion of the first media item may be a single point in time or, alternatively, may have a duration time.

In some embodiments, the media segment identifier includes a time code. The time code may include at least one of a starting time and an ending time. For example, the starting time may be indicative of a time position where the media segment starts. Likewise, the ending time may be indicative of a time position where the media segment ends.

A plurality of media segments of the number of media segments may overlap each other.

In some embodiments, providing the selected one or more second media items to the media device occurs while the first media item is being streamed to the media device.

In some embodiments, any one of said second media items is provided to the media device exclusively upon receiving an instruction from the media device to provide the second media item. For example, this instruction from the media device may advantageously comprise a media segment identifier (e.g., time code) of a selected media segment of the first media item.

In some embodiments, the method may further comprise obtaining location information indicative of a location of the media device. The selecting of one or more second media items to be associated with a respective media segment of the first media item may thus be performed in dependence of the obtained location information. Said location information may also be indicative of a location of the media device at a point in time when the first media item is being played by the media device. For example, the method may additionally comprise: receiving a data message from the media device, the data message comprising said location information; wherein the obtaining of the location information includes retrieving the location information from the received data message.

In some embodiments, the method may further comprise receiving an instruction from the media device to return one or more second media items associated with a selected media segment(s) of the first media item (e.g., a first media item that is being played). Advantageously, the instruction may comprise the media segment identifier(s) (e.g., the time code) of the selected media segment(s) of the first media item. The method may, for instance, additionally comprise: retrieving said media segment identifier(s) of the selected media segment(s) of the first media item; identifying the selected media segment(s) utilizing the retrieved media segment identifier(s); wherein the selecting of one or more second media items to be associated with a respective media segment of the first media item includes selecting the one or more second media items to be associated with the thus identified media segment(s); and wherein the associating of the selected one or more second media items with respective media segments of the first media segment includes associating the selected one or more second media items with the identified media segment(s).

In a second of its aspects, this disclosure presents a computer program, comprising instructions which, when executed on at least one processor, cause the at least one processor to carry out the method according to the first aspect described hereinabove. A carrier comprising the computer program according to second aspect may also be provided. The carrier may for example be any one of the following: an electronic signal, an optical signal, a radio signal or computer-readable storage medium.

In a third of its aspects, this disclosure presents computer server system configured to perform or otherwise execute the method according to the first aspect.

In one example implementation, the computer server system comprises at least one communications interface for communication (e.g., for communicating data messages to/from the computer server system); at least one processor; and at least one memory comprising instructions which, when executed on the at least one processor, cause the at least one processor to carry out the method according to the first aspect.

In another example implementation, the computer server system comprises at least one communications interface for communication; at least one processor; and at least one memory comprising instructions executable by the at least one processor whereby the computer server system is operative to: divide the first media item into a number of media segments, wherein each one of the number of media segments is identifiable by a media segment identifier; select one or more second media items to be associated with a respective media segment of the first media item, the second media items having a media format other than audio; associate the selected one or more second media items with respective media segments of the first media segment; and provide the selected one or more second media items media item to the media device.

In some embodiments, said media format other than audio includes a visual format. For example, the visual format may include a video format. Additionally, or alternatively, the visual format may include a text format and/or an image format.

A media segment of said number of media segments may be a portion of the first media item. For example, said portion of the first media item may be a single point in time or, alternatively, may have a duration time.

In some embodiments, the media segment identifier may include a time code. For instance, the time code may include at least one of a starting time and an ending time. The starting time may be indicative of a time position where the media segment starts. Likewise, the ending time may be indicative of a time position where the media segment ends.

Also, a plurality of media segments of the number of media segments may overlap each other.

In some embodiments, the at least one memory may comprise instructions executable by the at least one processor whereby the computer server system is operative to provide the selected one or more second media items media item to the media device while the first media item is being streamed to the media device.

In some embodiments, the at least one memory may comprise instructions executable by the at least one processor whereby the computer server system is operative to provide any one of said second media items to the media device exclusively upon receiving an instruction from the media device to provide the second media item. For example, the instruction from the media device may comprise a media segment identifier (e.g., time code) of a selected media segment of the first media item.

In some embodiments, the at least one memory may comprise instructions executable by the at least one processor whereby the computer server system is operative to obtain location information indicative of a location of the media device, and to select the one or more second media items to be associated with a respective media segment of the first media item in dependence of the obtained location information. Said location information may further be indicative of a location of the media device at a point in time when the first media item is being played by the media device.

In some embodiments, the at least one memory may comprise instructions executable by the at least one processor whereby the computer server system is operative to: receive a data message from the media device via the communications interface, the data message comprising the location information; and retrieve the location information from the received data message.

In some embodiments, the at least one memory may comprise instructions executable by the at least one processor whereby the computer server system is operative to: receive, via the communications interface, an instruction from the media device to return one or more second media items associated with a selected media segment(s) of the first media item (e.g., a first media item that is being played). Said instruction may e.g. comprise the media segment identifier(s) (e.g., the time code) of the selected media segment(s) of the first media item.

In some embodiments, the at least one memory may comprise instructions executable by the at least one processor whereby the computer server system is operative to: retrieve said media segment identifier(s) of the selected media segment(s) of the first media item; identify the selected media segment(s) utilizing the retrieved media segment identifier(s); select the one or more second media items to be associated with the thus identified media segment(s); and associate the selected one or more second media items with the identified media segment(s).

In a fourth of its aspects, this disclosure presents a method performed by a media device for playback of a streamed first media item having an audio format. In other words, the first media item may be an audio item.

A first request to play a second media item simultaneously is received via a user interface of the media device. The second media item is associated with the first media item and is preferably of a media format other than audio.

In response to receiving said first request, an instruction is provided to a computer server system for returning a second media item associated with a selected media segment of the first media item.

Furthermore, said second media item(s) is/are obtained or otherwise received from the computer server system. Still further, said second media item(s) can be played or otherwise presented.

Advantageously, the method comprises playing the first media item; wherein the above-mentioned actions or method steps are performed while the first media item is being played.

In some embodiments, said media format other than audio includes a visual format. For example, the visual format may include a video format. Additionally, or alternatively, the visual format may include a text format and/or an image format.

In some embodiments, the earlier-mentioned instruction may comprise a media segment identifier of the selected media segment of the first media item. For example, the media segment identifier may include a time code. The time code may advantageously include at least one of a starting time and an ending time. The starting time may be indicative of a time position where the media segment starts. Likewise, the ending time may be indicative of a time position where the media segment ends.

In some embodiments, the method may additionally comprise: sensing a location of the media device; determining location information based on the sensed location; and communicating the determined location information to the computer server system. For instance, the method may optionally also comprise: generating a data message to include the determined location information into the data message; wherein communicating the determined location information to the computer server system comprises communicating the generated data message to the computer server system. The location information may for example include position coordinates of the media device.

In a fifth of its aspects, this disclosure presents a computer program, comprising instructions which, when executed on at least one processor, cause the at least one processor to carry out the method according to the fourth aspect. A carrier comprising the computer program according to fifth aspect may also be provided. The carrier may for example be any one of the following: an electronic signal, an optical signal, a radio signal or computer-readable storage medium.

In a sixth of its aspects, this disclosure presents a media device configured to perform or otherwise execute the method according to the fourth aspect.

In one example implementation, the media device comprises a user interface; at least one communications interface for communication (e.g., for communicating data messages to/from the media device); at least one processor; and at least one memory comprising instructions which, when executed on the at least one processor, cause the at least one processor to carry out the method according to the fourth aspect.

In another example implementation, the media device comprises: a user interface; at least one communications interface for communicating data messages to/from the media device; at least one processor; and at least one memory comprising instructions executable by the at least one processor whereby the media device is operative to: i) receive, via the user interface of the media device, a first request to play a second media item simultaneously, the second media item being associated with the first media item and preferably being of a media format other than audio; ii) in response to receiving said first request, provide an instruction to a computer server system to return a second media item associated with a selected media segment of the first media item that is being played; and iii) receive, via the at least one communications interface, said second media item from the computer server system, and in response thereto, iv) playing or otherwise presenting the second media item.

In some embodiments, the at least one memory may advantageously comprise instructions executable by the at least one processor whereby the media device is operative to play the first media item; and wherein i), ii), iii), iv) hereinabove can be performed while the first media item is being played.

In some embodiments, said media format other than audio includes a visual format. For example, the visual format may include a video format. Additionally, or alternatively, the visual format may include a text format and/or an image format.

In some embodiments, the earlier-mentioned instruction comprises a media segment identifier of the selected media segment of the first media item. The media segment identifier may e.g. include a time code. The time code may advantageously include at least one of a starting time and an ending time. The starting time may be indicative of a time position where the media segment starts. Likewise, the ending time may be indicative of a time position where the media segment ends.

In some embodiments, the at least one memory may comprise instructions executable by the at least one processor whereby the media device is operative to: sense a location of the media device (e.g., by means of a location-determining device); determining location information (e.g., by means of said location-determining device) based on the sensed location; and communicating (e.g., via the at least one communications interface) the determined location information to the computer server system.

In some embodiments, the at least one memory may comprise instructions executable by the at least one processor whereby the media device is operative to: generate a data message to include the determined location information into the data message; and communicate (e.g., via the at least one communications interface) the generated data message to the computer server system.

The above-mentioned location information may include position coordinates of the media device.

For example, the media device may be a portable communication device. The portable communication device may be embodied as a mobile telephone. Alternatively, the portable communication device may be embodied as a tablet computer. Alternatively, the portable communication device may be embodied as a laptop computer.

In alternative embodiments, the media device may be a stationary communication device. The stationary communication device may be embodied as a stationary computer.

In a seventh of its aspects, this disclosure presents a first media item for streaming from a computer server system including one or more computer servers to a media device. The first media item has an audio format. In other words, the first media item may be an audio item. The first media item comprises a number of media segments (typically several media segments), wherein each one of the number of media segments is identifiable by a media segment identifier, and wherein at least one of the number of media segments is associated with a respective second media item corresponding to a respective media segment identifier, the second media item preferably having a media format other than audio.

The media format other than audio may include a visual format. For instance, the visual format may include a video format, a text format and/or an image format.

In some embodiments, a media segment of said number of media segments is a portion of the first media item. Said portion of the first media item may be a single point in time or, alternatively, said portion may have a duration time.

In some embodiments, the media segment identifier may include a time code. Advantageously, the time code may include at least one of a starting time and an ending time. The starting time may be indicative of a time position where the media segment starts. Additionally, or alternatively, the ending time may be indicative of a time position where the media segment ends.

In some embodiments, a plurality of media segments of the number of media segments may overlap each other.

The various aspects and embodiments described hitherto allow for a novel user experience, which is primarily focusing on media content having an audio format—i.e., audio content. At the same time, some aspects and embodiments herein enable the consumption of other media content (e.g., visual media content such as video content) 'on demand' in an efficient manner. According to some embodiments, the provision of said visual media content is only performed 'on demand' or based on user-initiated instructions. This has the advantage that audio content and video content do not necessarily have to be streamed concurrently from the computer server system to the media device. This way, bandwidth resources are not unnecessarily consumed in the media streaming environment. Furthermore, complex operations such as synchronizing audio content and visual content during streaming of both audio content and visual content can be avoided or at least reduced. This, in turn, also allows for an increasingly sustainable usage of bandwidth resources and other resources throughout the media streaming environment.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

Figure 1:
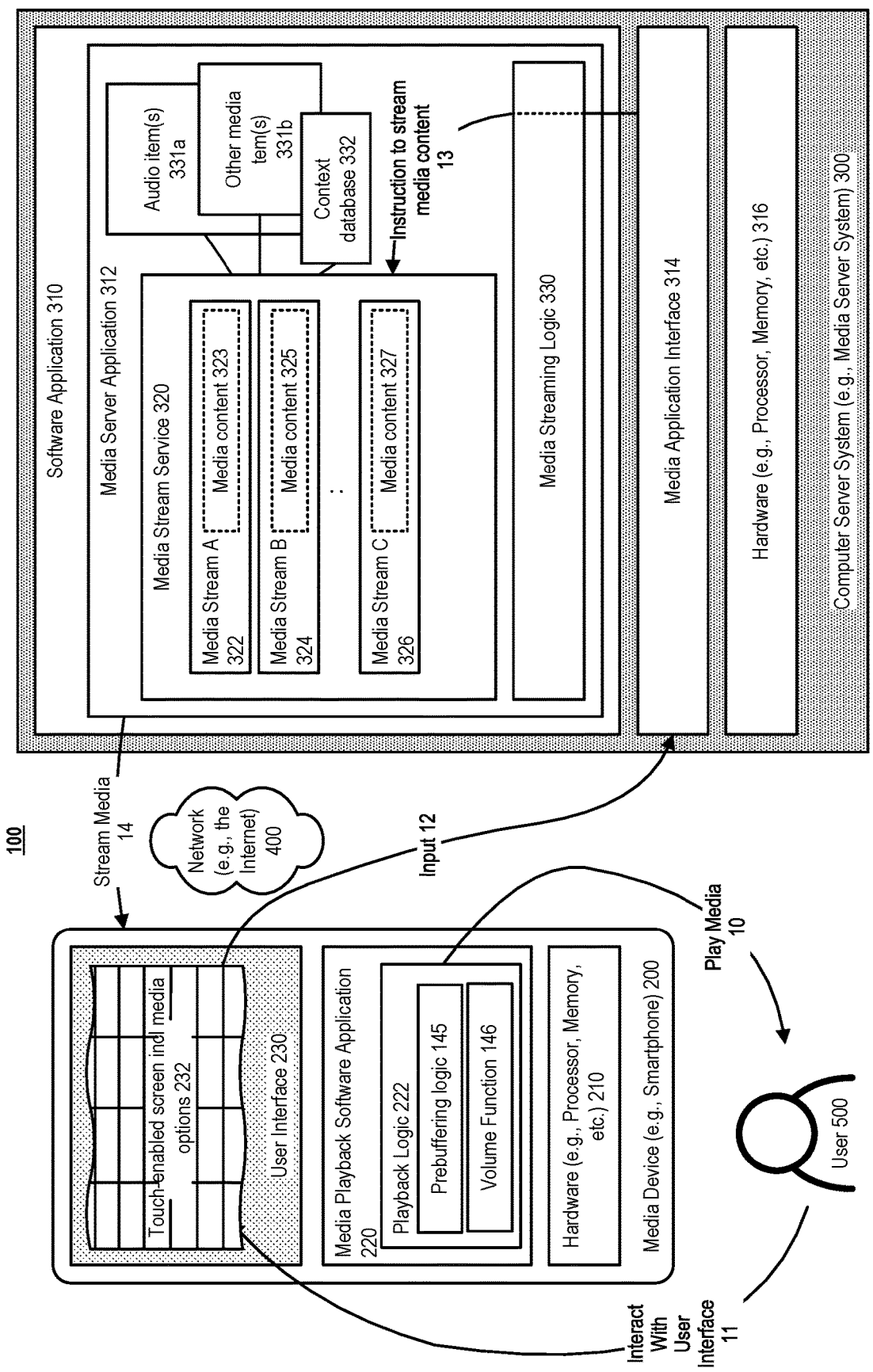
FIG. 1 illustrates a client-server environment for playback of streamed media content.

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

As described earlier herein, some existing solutions for streaming of media content may be inadequate. Among other things, it is a general object of the embodiments described herein to enable a novel user experience when consuming streamed audio content.

To address this, in accordance with an aspect, described herein is a method of streaming of a first media content item having an audio format from a computer server system to a media device. The media device may be a portable communication device or, alternatively, a stationary communication device. For example, in one example scenario, the first media item is being streamed from the computer server system to the media device for playback at the media device. Thus, the first media item is being played at the media device. While the first media item is being played, a user of the media device may interact with and operate a user interface of the media device. A first request to play a second media item simultaneously (as the first media item) is received by the media device via the user interface. The second media item is associated with the first media item and is typically (but not necessarily) of a media format other than audio. In response to receiving said first request, the media device is operable to provide or otherwise communicate an instruction to the computer server system to return a second media item associated with a selected media segment of the first media item that is being played at the media device. The computer server system is operable to divide the first media item into a number of media segments, wherein each one of the number of media segments is identifiable by a media segment identifier; select one or more second media items to be associated with a respective media segment of the first media item; associate the selected one or more second media items with respective media segments of the first media segment; and provide or otherwise communicate (e.g., stream) the selected one or more second media items media item to the media device, e.g., upon receiving the earlier-mentioned instruction from the media device. Accordingly, the one or more second media items may be obtained or otherwise received by the media device and the media device may thus also play or otherwise present the obtained one or more second media items.

This may allow for a novel user experience, which is primarily focusing on media content having an audio format—i.e., audio content.

As will be appreciated upon reading the following detailed description, some aspects and embodiments herein enable the consumption of other media content (e.g., visual media content such as video content) 'on demand' in an efficient manner. According to some embodiments, the provision of said visual media content is only performed 'on demand' or based on user-initiated instructions. This has the advantage that audio content and video content do not necessarily have to be streamed concurrently from the computer server system to the media device. This way, bandwidth resources are not unnecessarily consumed in the media streaming environment. Furthermore, complex operations such as synchronizing audio content and visual content during streaming of both audio content and visual content can be avoided or at least reduced. This, in turn, also allows for an increasingly sustainable usage of bandwidth resources and other resources throughout the media streaming environment.

Reference is now made to the figures, where FIG. 1 illustrates an example environment where embodiments of the present invention may be applied. The description in connection with FIG. 1 is intended to introduce a possible environment where embodiments of the present invention may be reduced to practice.

With continued reference to FIG. 1, an example client-server environment 100 for playback of media content will therefore now be described in further detail. The client-server environment 100 may include a media device 200 and a computer server system 300, e.g. operating as a media server system. The computer server system 300 may comprise one single computer or several computers. The media device 200 may be communicatively connectable to the computer server system 300 via a network 400, such as the Internet. As can be seen in FIG. 1, only a single media device 200 and a single computer server system 300 are shown. However, the computer server system 300 may support the simultaneous use of multiple media devices, and/or the media device 200 can simultaneously access media content at multiple computer server systems.

As shown in FIG. 1, the media device 200 may be used for the playback of audio content such as music, which is provided by the computer server system 300. The media device 200 may be a mobile communication device (e.g. a mobile telephone such as a smartphone). Alternatively, the media device 200 may be a tablet computer. In yet other embodiments, the media device 200 may be any other media device capable of playback of media content such as, for example, one of the media devices of the following group: a personal computer, a desktop computer, a laptop computer, and a mobile media device (e.g. a handheld entertainment device, a digital media player, or other media device).

The media device 200 may include one or several physical computer resources, or hardware resources 210. The hardware resources 210 may e.g. include one or several processors (or, processing circuitry), a communications interface (or, communication circuitry) and one or several memories.

Likewise, the computer server system 300 may include one or several physical computer resources, or hardware resources 316. The hardware resources 316 may likewise include e.g. one or several processors (or, processing circuitry), a communications interface (or, communication circuitry) and one or several memories.

The computer server system 300 may include an operating system or other processing system which supports execution of a software application 310, including a media server application 312 which may be used, for example, to stream media content. A media stream service 320 may be used to buffer media content, for streaming to one or more media streams 322, 324, 326. A media application interface 314 may receive requests from media devices 200 or other systems, to retrieve media content 331 from the computer server system 300.

Media content, or media items 331a, 331b, may be provided, for example, within a storage such as a memory (e.g., including a database), or may be received by the computer server system 300 from another source (not shown). This another source (not shown) could be external to the computer server system 300, i.e. it may be located remotely from the computer server system 300.

Furthermore, a context database 332 may be provided to store data associated with the presentation of media items by the media device 200. For example, the context databases may, e.g., include current position data within a certain media stream that is being presented or otherwise played by the media device 200. Additionally, or alternatively, the context database may include playlist information associated with a certain media stream.

A media streaming logic 330 may be used to retrieve or otherwise access the media items 331s, 331b in response to requests from media devices 200 or other systems, and populate the media stream service with streams 322, 324, 326 of corresponding media content data 323, 325, 327 that may be returned, i.e. streamed, to the requesting media device 200.

The media device 200 comprises a user interface (UI) 230, which may advantageously be adapted to display or otherwise provide a visual array of media options 232, for example as a two-dimensional grid, a list, or other visual format, and determine a user input from user 500. Each media option in the visual array of media options 232 correspond to a respective media stream 322, 324, 326. As will be appreciated, the UI 230 may preferably, but not necessarily, comprise a touch-enabled display screen. Selecting a particular media option within the visual array 232 may be used, or otherwise interpreted, as a request or instruction to the media server application 312 to stream or otherwise return a corresponding particular media item. For example, in accordance with some embodiments, the software application 310 at the computer server system 300 may be used to stream or otherwise communicate media content to the media device 200, wherein the user interface 230 at the media device 200 is adapted to display a plurality of media options that correspond to respective media streams.

In accordance with some embodiments, the media device 200 may also include a media playback application 220, together with a playback logic 222, pre-buffering logic 145, and a volume function 145, which may be used to control the playback of media content that is received from the media server application 312, for playback by the media device 200, as described in further detail below. In some embodiments, the user 500 may thus control functions such as the volume of a played media item and/or the playback speed of a media item that is being played.

As will be appreciated, the user 500 may interact 11 with the user interface 230 of the media device 200 and issue requests (or request messages), for example the playing of an audio item (e.g., a song) associated with a selected media option at the media device 200. The user's selection of a particular media option may be communicated 12 to the media server application 312, via the media application interface 314. The media server application 312 may then be instructed 13 to stream corresponding media item, including one or more streams of media content data 323, 325, 327, and subsequently stream 14 or otherwise communicate the selected media to the user's media device 200. In accordance with some embodiments, pre-buffering requests from the media device 200 may also be communicated 12 to the media server application 312 via the media application interface 314. At the media device 200, in response to the user's interaction with the user interface 230, the media playback application 220, including the playback logic 222, may play 10 the requested, and thus selected, media content to the user 500.

Figure 2:
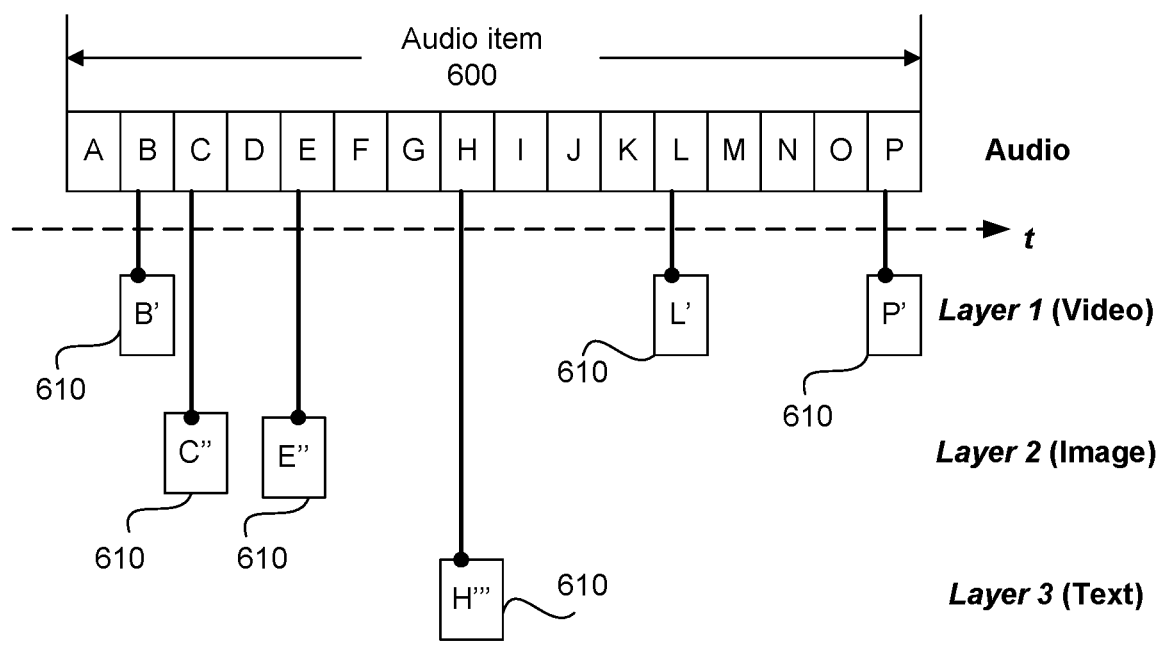
FIG. 2 illustrates a first media item having an audio format and associated second media items, e.g. video items, text items and image items.

Reference is now made to FIG. 2, which is an illustration of a first media item 600 according to various embodiments of this disclosure. The first media 600 has an audio format. In other words, the first media item may be an audio item 600 or audio stream. The audio item may e.g. be a song or a podcast. The first media item 600, which will hereinafter interchangeably be referred to as an audio item, is suitable for streaming from the computer server system 300 to the media device 200 described in conjunction with FIG. 1.

As can be seen in FIG. 2, the first media item 600 comprises a number of media segments, here exemplified by media segments A, B, . . . , P. In other words, the first media item may comprise several (i.e., two or more) media segments. In FIG. 2, all media segments are shown to have a certain duration, i.e. length in time. However, as will be appreciated, a media segment is a portion of the first media item 600. As such, a media segment does not necessarily have to have a duration. Instead, a media segment may simply be a single point in time. Furthermore, FIG. 2 schematically shows 16 media segments of equal length in time (i.e., equal duration). This is for illustrative purposes only. It should be appreciated that a first media item may be provided with media segments having unequal length in time.

Each media segment is identifiable by a media segment identifier. Typically, but not necessarily, the media segment identifier may be a time code. The time code may include at least one of a starting time and an ending time. For example, the starting time may be indicative of a time position where the media segment starts. Additionally, or alternatively, the ending time may be indicative of a time position where the media segment ends.

Furthermore, although not schematically illustrated in FIG. 2, it will be appreciated that media segments could overlap each other. For example, a first media segment may have a duration of five seconds and a subsequent second media segment may have a duration of ten second, whereby five seconds are shared between the two media segments.

One or more of the several media segments A, B, . . . , P are associated with a respective second media item corresponding to a respective media segment identifier. In the example shown in FIG. 2, the media segments B, C, E, H, L and P are associated with respective second media items. Advantageously, the second media items are of a media format other than audio. Typically, a media format other than audio is a visual format.

For each audio item 600, there may exist several different second media items (collectively denoted 610 in FIG. 2) that are associated with the audio item in question. In some embodiments, there may exist different layers of visual media items such as video ("Layer 1"), image ("Layer 2"), and text ("Layer 3").

For example, the audio item 600 may be a song. The song may have video items 610 (i.e., B', L' and P') associated with its media segments B, L and P, respectively. The video items B', L' and P' (610) may for example be video items provided by the artist who created the song 600. As such, the video items B', L' and P' may be used to enrich the user experience by providing another layer of stories (here exemplified by the corresponding videos) to the streamed song 600. Additionally, or alternatively, the song 600 may have image items 610 (i.e., C" and E") associated with its media segments C, and E, respectively. The image items C" and E" (610) may for example be image items provided by the artist who created the song 600. As such, the image items C" and E" may also be used to enrich the user experience by providing still another layer of stories (here exemplified by the corresponding images) to the streamed song 600. Additionally, or alternatively, the song 600 may have text items 610 (i.e., H'") associated with its media segment H'". The text item H'" (610) may for example be text items including text provided by the artist who created the song 600. The text may e.g. include lyrics of the song and/or a URL (Uniform resource Locator) link or similar to a webpage of the artist performing the song 600. As such, the text items H'" may also be used to enrich the user experience by providing yet another layer of stories (here exemplified by the corresponding text) to the streamed song 600.

Although not illustrated in FIG. 2, it will be appreciated that it is conceivable that the one or more second media items may actually also have an audio format. That is, in some embodiments one or more of the second media items may be audio item(s). For example, these additional audio items may be segments or portions of audio not necessarily pertaining to the original audio item 600.

In some embodiments, it is made possible to change, or otherwise modify, the one or more second media items 610 associated with the first media item (audio item) 600 in FIG. 2. This allows for an increasingly flexible solution for the distribution of the first media item 600. For example, users can individually control the different layers of second media items 610 at anytime and anywhere. In some embodiments, users may also individually control which second media item(s) 610 to append to or otherwise associate with the first media item 600. This may enable users such as artists to individually control second media items 610 other than audio (e.g., video, image and/or text) associated with their music songs 600. In other words, this opens up for a completely new way for artists to control the distribution of their own artistic creations. In a sense, this will also contribute to artist being able to connect more easily to their respective fans.

As will be appreciated from the above discussion with reference to FIG. 2, a first media item 600 may be decorated with one or several layers of additional media items, namely the one or more second media items 610. In this way, it is for example made possible to append visual media item(s) 610 to an audio item 600 that is being played and thereby enrich the user experience when enjoying the audio item 600 at the media device.

Figure 3:
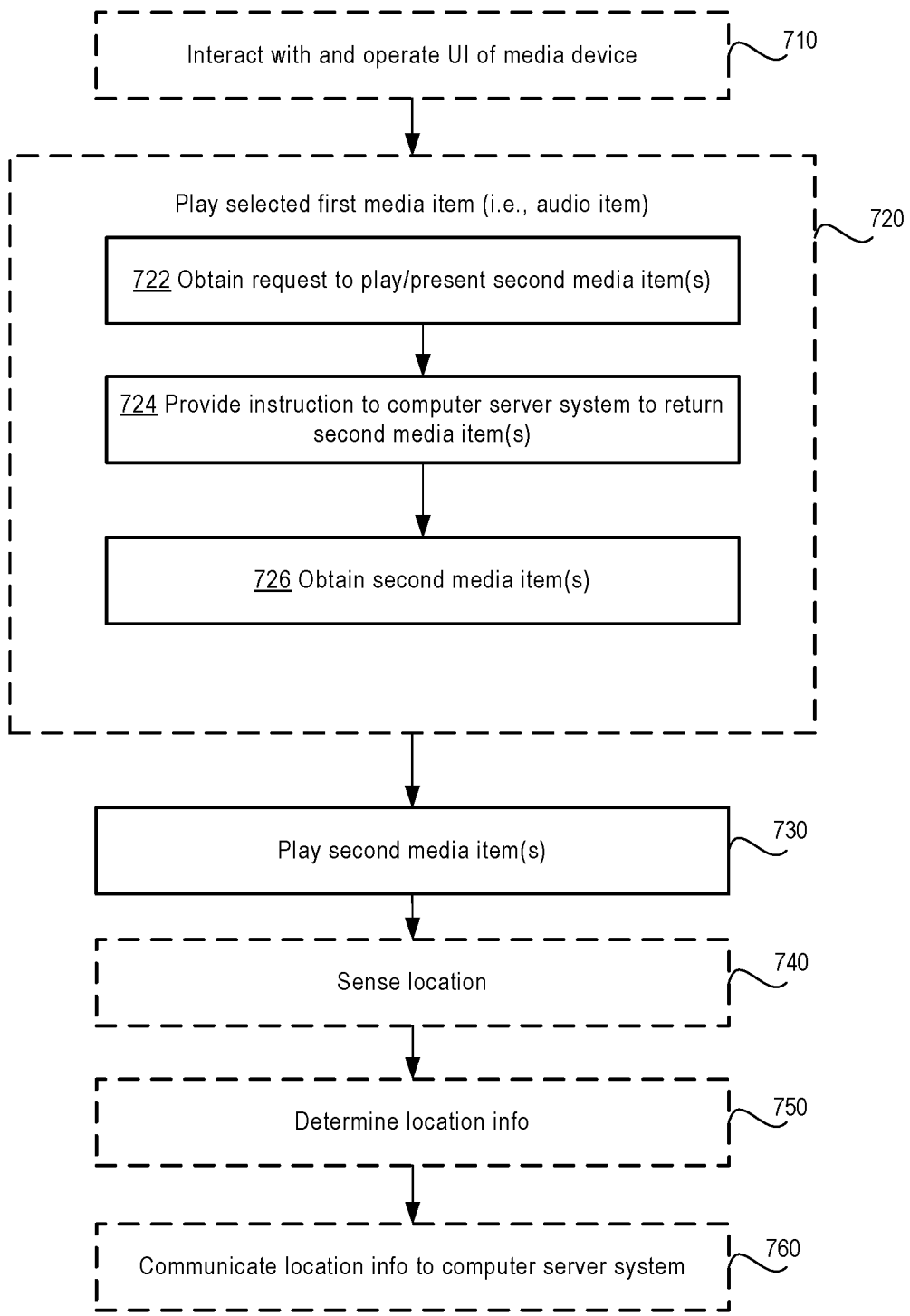
FIG. 3 illustrates a flowchart of a method in accordance with an embodiment.
Figure 4:
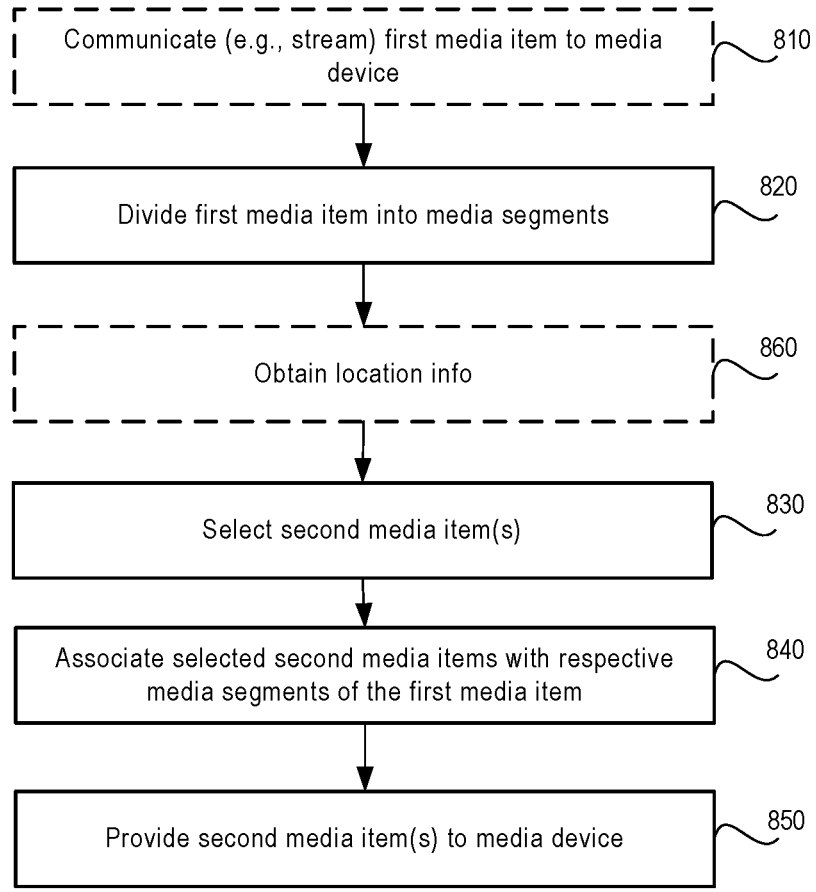
FIG. 4 illustrates a flowchart of a method in accordance with an embodiment.

Reference is now made to FIGS. 3 and 4 together with FIGS. 1 and 2 which have been described hitherto.

FIG. 3 is a flowchart illustrating an aspect of a method performed by or otherwise executed in a media device 200 (see FIG. 1). The media device 200 may be a portable communication device such as a mobile telephone, a tablet computer or a laptop computer. Alternatively, the media device 200 may be a stationary communication device such as a stationary computer. The media device 200 is configured for playback of streamed media as discussed earlier in conjunction with FIG. 1.

Action 710: A user 500 may interact 11 with and operate the UI 230 of the media device 200. For example, the user 500 may interact 11 with the user interface (UI) 230 of the media device 200 and issue a request, for example, the playback of a first media item 600 having an audio format and being associated with a selected media option 232 at the UI 230 of media device 200. The first media item 600 may thus be an audio item (e.g., a song). In more detail, the user's selection of a particular media option 232 at the UI 230 may be communicated 12 to the media server application 312, via the media application interface 314 (see FIG. 1). The media server application 312 may then be instructed 13 to stream the corresponding first media item 600, including one or more streams of media content data (e.g., 323), and subsequently stream 14 or otherwise communicate the selected first media item to the user's media device 200. Optionally, pre-buffering requests from the media device 200 may also be communicated 12 to the media server application 312 via the media application interface 314. At the media device 200, in response to the user's interaction with the UI 230, the media playback application 220, including the playback logic 222, may play 10 the requested, and thus selected, first media item to the user 500.

Action 720: Accordingly, the first media item 600 may be played or otherwise presented at the media device 200.

Action 722: While the first media item 600 is being played, i.e. during playback of the first media item 600, a first request to play one or more second media items 610 may be obtained. Typically, but not necessarily, the first request may be a request to play or otherwise present said one or more second media items 610 simultaneously, i.e. at the same time as the first media item 600 is being played. For example, the first request may be received via the UI 230 of the media device 200. Advantageously, the one or more second media items 610 are of a format other than audio. For example, the media format other than audio may include a visual format. The visual format may, e.g., be a video format, an image format or a text format as described in conjunction with FIG. 2.

Action 724: In response to obtaining (e.g., receiving) 722 the first request, e.g. via the UI 230, an instruction or command is provided (e.g., transmitted or otherwise communicated) to the computer server system 300 to return one or more second media items 610 associated with a selected media segment of the first media item that is being played. For example, the user 500 may interact 11 with and operate the UI 230 of the media device 200 to select a certain media segment of the played first media item 600 of his/her choice. Selecting a particular media segment (e.g., any one of media segments A, B, . . . , P in FIG. 2) of the played first media item 600, e.g. within the visual display 232 of the UI 230, may hence be used, or otherwise interpreted, as a request or instruction to the computer server system 300 to return one or more second media item(s) 610 that are associated with the thus selected media segment of the first media item 600.

Advantageously, the above-mentioned instruction to the computer server system comprises a media segment identifier of the selected media segment of the first media item. The media segment identifier is configured to uniquely identify the thus selected media segment of the first media item 600. For example, the media segment identifier may comprise a time code. The time code may include at least one of a starting time and an ending time. The starting time may be indicative of a time position within the first media item 600 where the media segment starts. Additionally, or alternatively, the ending time may be indicative of a time position within the first media item 600 where the media segment ends.

Action 726: Subsequently, one or more second media items are obtained. For example, the one or more second media items may be received (e.g., streamed) from the computer server system 300. As will be appreciated, and in accordance with some embodiments, one or more of the second media items may be pre-buffered, e.g., utilizing the pre-buffering logic 145 (see FIG. 1).

Action 730: In response thereto, the one or more second media items can be played or otherwise presented.

As will be appreciated, the one or more second media items can be played or otherwise presented at their respective time positions within the first media item 600. This may e.g. occur during the playback of the first media item 600 at the media device 200. Alternatively, the user 500 may interact with and operate the UI 230 (e.g., utilizing the touch-enabled display screen 232) to scroll through a first media item and thereby select, or otherwise, choose a particular media segment (within the first media item 600) whose second media item(s) 610 the user wishes to preview or otherwise experience.

Action 740: Optionally, a location may also be sensed or otherwise detected. The sensed location is thus indicative of a geographic location or position of the media device 200.

Action 750: Based on the thus sensed location, location information may be determined. The location information may for example include position coordinates of the media device 200.

As will be appreciated, actions or method steps 740 and 750, respectively, may be reduced to practice in many different ways. In other words, position coordinates and thus location information can be determined in many different ways. For instance, in some embodiments the media device 200 may include a positioning device 210D (e.g., a Global Positioning System (GPS) device) or positioning functionality configured to determine the position coordinates, and thus the location, of the media device 200. In some embodiments, position coordinates and thus location information associated with the media device 200 may be determined by measuring received signal strengths from transmitters (e.g., access points) utilizing known locations and trilateration positioning. In some embodiments, position coordinates and thus location information related to the media device 200 may be determined using any commercially available geolocation service. In some embodiments, the listed ways of sensing the location and determining the location information could be combined.

Action 760: Once determined, the location information can be communicated (e.g., transmitted) to the computer server system 300 for further use by the computer server system 300.

In some embodiments, the method may additionally comprise generating (not shown) a data message to include the determined location information into the data message. If so, communicating the determined location information to the computer server system comprises communicating the thus generated data message to the computer server system.

As will be appreciated, not all actions or method steps described in conjunction with FIG. 3 are essential for reducing the subject-matter into practice. In particular, boxes in dashed line are conceivable as optional actions or method steps. Furthermore, and as will also be appreciated, the various actions or method step do not necessarily have to performed in the exact order as described hereinabove. It is hence conceivable that the actions or method steps described hereinabove could be performed in different orders than those explicitly described.

Reference is now made to FIG. 4, which is a flowchart illustrating an aspect of a method performed by or otherwise executed in a computer server system 300 (see FIG. 1). The computer server system 300 may be implemented by one single computer server. Alternatively, the computer server system 300 may be implemented by several computer servers operating in a distributed manner.

Action 810: A first media item having an audio format may be communicated or otherwise streamed to the media device 200 (see FIG. 1). In other words, an audio item or audio stream can be communicated or otherwise streamed to the media device 200.

Action 820: A first media item, here exemplified by an audio item 600, can be divided into a number of media segments (see FIG. 2). Typically, the first media item can be divided into multiple media segments. A media segment may thus be a portion of the first media item. A media segment may for instance be a single point in time. Alternatively, a media segment may have a duration, i.e. a length in time. Each one of the number of media segments is identifiable by a media segment identifier. Consequently, each one of the number of media segments is uniquely identified by its respective media segment identifier. The media segment identifier may e.g. be a time code. The time code may include at least one of a starting time and an ending time. The starting time may be indicative of a time position within the first media item 600 where the media segment in question starts. Additionally, or alternatively, the ending time may be indicative of a time position within the first media item 600 where the media segment in question ends.

Action 830: One or more second media items 610 to be associated with a respective media segment of the first media item are selected. Typically, but not necessarily, the second media items have a media format other than audio, e.g. a visual format. The visual format may e.g. include a video format, an image format and/or a text format as described earlier.

In other words, for each one of one or more uniquely identified media segments 610 within a certain first media item 600 it is possible to select corresponding second media items 610 to be associated with respective media segments.

The selection in action 830 may be performed automatically by the computer server system 300. Alternatively, the selection may be user-initiated such that a user 500 can individually control which second media item(s) 610 to append or otherwise associate to which media segment A, B, . . . , P within a certain first media item 600. In some implementations, a request message may be received from a media device 200. This request message may include, or is otherwise be indicative of, an instruction requesting the computer server system 300 to select certain second media content item(s) 610 to be associated with one or more user-selected media segments A, B, . . . , P within a first media item 600. In response to receiving such request message, the second media item(s) 610 may be selected accordingly in action 830. This allows for an increasingly flexible solution for the distribution of media content. For example, users of media devices can control the second media content items (e.g., visual content items associated with a certain audio item) at anytime and anywhere. This, in turn, may for example enable users such as artists to individually control second media content items associated with their music songs. In other words, this opens up for a completely new way for artists to control the distribution of their own artistic creations. In a sense, this will also contribute to artist being able to connect more easily to their respective fans. Furthermore, this may contribute to completely new ways of expressing and delivering artistic creations. For example, music artists may add or otherwise append additional art or additional stories to their music creations. In the existing art, this has not been made available for services or technologies where audio is the primary media content to be delivered to the user of media devices 200.

Action 840: Once the various second media items have been selected, the one or more second media items can be associated with its/their respective media segment(s) of the first media item. To this end, the earlier-mentioned media segment identifiers may advantageously be utilized to identify or otherwise locate the different media segment(s) within the first media idem 600.

In a sense, this allows for a way of decorating the first media item (here exemplified by an audio item) by additional second media item(s) which are typically of a different format than audio, e.g. visual media items. This allows for enriching a first media item with layers of additional media items.

Action 850: The selected one or more second media items to the media device. In other words, the one or more selected second media items may be communicated or otherwise streamed to the media device 200.

Action 860: Optionally, location information may also be obtained. In other words, location information indicative of a location or geographic position of the media device 200 may be obtained. For example, the location information may be indicative of a location or geographic position of the media device 200 at a point in time when the first media item is being played at the media device 200. If location information is obtained, the selection of the one or more second media items(s) in action 830 may advantageously be made in dependence of the obtained location information.

In some embodiments, a data message comprising said location information is received. If so, obtaining the location information includes retrieving the location information from the received data message.

Furthermore, in some embodiments the selected one or more second media items are provided (i.e. communicated or otherwise streamed) to the media device 200 while the first media item is being streamed to the media device 200, i.e. during the playback of the first media item 600 at the media device 200.

Still further, in some embodiments said one or more second media items is provided (i.e., communicated or otherwise streamed) to the media device 200 exclusively upon receiving an instruction from the media device 200 to provide the second media item(s). This allows for a novel 'on demand' user experience where a user can experience additional second media item(s) associated with a certain first media item only when the user actually desires to preview or otherwise experience said additional second media item(s).

As will be appreciated, not all actions or method steps described in conjunction with FIG. 4 are essential for reducing the subject-matter into practice. In particular, boxes in dashed line are conceivable as optional actions or method steps. Furthermore, and as will also be appreciated, the various actions or method step do not necessarily have to performed in the exact order as described hereinabove. It is hence conceivable that the actions or method steps described hereinabove could be performed in different orders than those explicitly described.

In order to ease the understanding of certain example advantages of some aspects and embodiments described herein, the following discussion will describe a possible use case scenario where aspects and embodiments described herein could be applied. To this end, reference is again made to FIGS. 1-4. In one example scenario, a user 500 may be occupied, e.g. by cooking a dinner. At the same time the user 500 is streaming music, which is played at one or more loudspeaker devices (not shown in FIG. 1) communicatively connected to the media device 200. The one or more loudspeakers are separate and distinct from the media device 200 and the computer server system 300, respectively. For example, the music may be played at the loudspeaker devices using a service such as, e.g., SPOTIFY CONNECT. During the playback, the user 500 may find a part of song that is currently being played as particularly appealing. The user 500 may know the title of the song and the artist of the song. However, the user 500 may also want to know more about the song and/or having stories told about this song (or, the part of the song he/she found particularly appealing). At a later time, when the user is no longer occupied by the cooking, the user 500 may interact with and operate the touch-enabled display screen 232 of the UI 230 of his/her media device 200 and thereby return to the earlier-played song that was played when the user 500 was too busy cooking. By interacting with and operating the UI 230 of the media device 200, the user 500 may select a certain media segment (i.e., a point in time or portion within the played song) to experience a second media item(s) that is/are associated with this user-selected media segment within the song. For example, the associated second media item could be a video item including video content describing how the played song originally came about. It may e.g. include video content recorded by the artist herself/himself performing the song in question. By continuing his/her interaction and operations with the touch-enabled display screen 232 of the UI 230, the user 500 may e.g. scroll through a certain first media item and experience layers of additional second media items, e.g. visual media items (e.g., including lyrics of the song, URL links to a webpage associated with the artist performing the song, etcetera) at various positions (e.g., time positions) throughout the first media item 600 in question. In a sense, the user 500 may therefore preview or otherwise experience associated stories that are related to a user-selected song that has been or is being played by means of the media device 200. As will be appreciated, this may allow for an enriched user experience.

In another example scenario, a user 500 may be occupied, e.g. by driving a car. At the same time the user 500 may be listening to a first media item 600 in the form of a podcast which is played at one or more loudspeaker devices of the car (not shown in FIG. 1) that is/are communicatively connected to the media device 200. During the playback, the user 500 may find a certain part of the podcast particularly appealing. The user 500 may be too occupied driving his/her car and may stop playing the podcast in order to be able to focus more properly on the driving itself. At a later time, when the user 500 is no longer driving his/her car, the user 500 may interact with and operate the touch-enabled display screen 232 of the UI 230 of his/her media device 200 and thereby return to the earlier-played part or segment of the podcast. By interacting with and operating the UI 230 of the media device 200, the user 500 may select this certain media segment to re-experience this part of the podcast. Also, the user will be able to experience additional second media item(s) that is/are associated with this user-selected media segment within the podcast. For example, the associated second media item(s) could include visual media content such as a video item including video content describing related stories associated with the podcast in question. By continuing his/her interaction and operations with the touch-enabled display screen 232 of the UI 230, the user 500 may e.g. scroll through the podcast and experience layers of additional second media items at various positions (e.g., time positions) throughout the podcast. As will be appreciated, this may allow for an enriched user experience.

Figure 5:
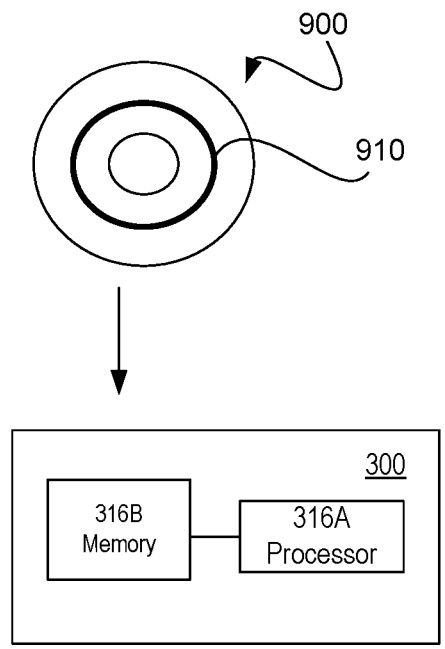
FIG. 5 illustrates a carrier containing a computer program, in accordance with an embodiment.

Turning now to FIG. 5, another aspect will be briefly discussed. FIG. 5 shows an example of a computer-readable medium, in this example in the form of a data disc 900. In one embodiment, the data disc 900 is a magnetic data storage disc. The data disc 900 is configured to carry instructions 910 that can be loaded into a data storage (e.g., memory) of an apparatus (e.g., computer server system 300 in FIG. 1). Upon execution of said instructions by a processor of the apparatus, the apparatus is caused to execute a method or procedure according to any one of the embodiments described herein such as those described in connection with FIG. 4. The data disc 900 is arranged to be connected to or within and read by a reading device (not shown), for loading the instructions into the processor. One such example of a reading device in combination with one (or several) data disc(s) 900 is a hard drive. It should be noted that the computer-readable medium can also be other mediums such as compact discs, digital video discs, flash memories or other memory technologies commonly used. In such an embodiment, the data disc 900 is one type of a tangible computer-readable medium. The instructions may alternatively be downloaded to a computer data reading device, such as a computer or other media device capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

Figure 6:
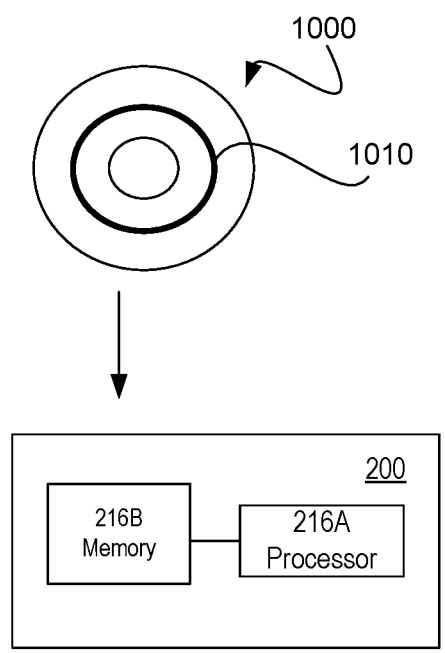
FIG. 6 illustrates a carrier containing a computer program, in accordance with another embodiment.

Turning now to FIG. 6, another aspect will be briefly discussed. FIG. 6 shows an example of a computer-readable medium, in this example in the form of a data disc 1000. In one embodiment, the data disc 1000 is a magnetic data storage disc. The data disc 1000 is configured to carry instructions 1010 that can be loaded into a data storage (e.g., memory) of an apparatus (e.g., media device 200 in FIG. 1). Upon execution of said instructions by a processor of the apparatus, the apparatus is caused to execute a method or procedure according to any one of the embodiments described herein such as those described in connection with FIG. 4. The data disc 1000 is arranged to be connected to or within and read by a reading device (not shown), for loading the instructions into the processor. One such example of a reading device in combination with one (or several) data disc(s) 1000 is a hard drive. It should be noted that the computer-readable medium can also be other mediums such as compact discs, digital video discs, flash memories or other memory technologies commonly used. In such an embodiment, the data disc 1000 is one type of a tangible computer-readable medium. The instructions may alternatively be downloaded to a computer data reading device, such as a computer or other media device capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

Figure 7:
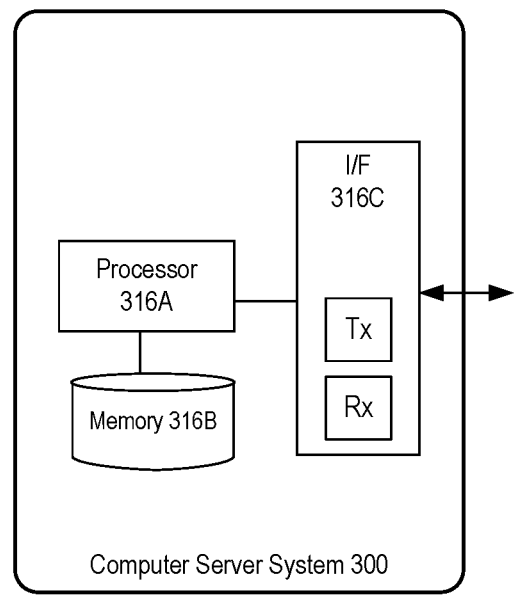
FIG. 7 illustrates an example implementation of an embodiment of a computer server system in FIG. 1.

With reference to FIG. 7, an example implementation of the computer server system 300 of FIG. 1 will be described in some further detail. For example, the computer server system 300 shown in FIG. 1 may comprise one or several computer servers, as described earlier. More specifically, FIG. 7 schematically illustrates one example implementation of a computer server system 300, here exemplified by a single computer server in order to ease the understanding of the disclosure. The computer server system 300 shown in FIG. 7 is configured to execute, or otherwise perform, the methods described throughout this disclosure e.g. those described with reference to FIG. 4. As is schematically illustrated in FIG. 7, the computer server system 300 comprises hardware 316. For example, the computer server system 300 may comprise one or more processors 316A and one or more memories 316B. Also, a communications interface 316C, or a communications circuitry, may be provided in order to allow the computer server system 300 to communicate with media devices 200 and/or other computer server systems 300, e.g. via a network 400 such as the Internet. To this end, the communications interface 316C may comprise a transmitter (Tx) and a receiver (Rx). Alternatively, the communications interface 316C may comprise a transceiver (Tx/Rx) combining both transmission and reception capabilities. The communications interface 316C may include a radio frequency (RF) interface allowing the computer server system 300 to communicate with media devices 200 and/or other computer servers 300 through a radio frequency band through the use of different radio frequency technologies such as 5G New Radio, LTE (Long Term Evolution), WCDMA (Wideband Code Division Multiple Access), or any other cellular network standardized by the 3rd Generation Partnership Project (3GPP), or any other wireless technology such as Wi-Fi, Bluetooth®, etcetera. As described with reference to FIG. 1, the computer server system 300 may also comprise one or more applications, e.g. the software application 310 including the media server application 312. The applications are sets of instructions (e.g., computer program code) that when executed by the one or more processors 316A controls the operation of the computer server system 300. In the example implementation shown in FIG. 7, the at least one memory 316B comprises instructions executable by the at least one processor 316A whereby the computer server system 300 is operative to: divide the first media item into a number of media segments, wherein each one of the number of media segments is identifiable by a media segment identifier; select one or more second media items to be associated with a respective media segment of the first media item, the second media items having any media format; associate the selected one or more second media items with respective media segments of the first media segment; and provide the selected one or more second media items media item to the media device.

As described earlier, the second media items advantageously have a media format other than audio. The media format other than audio preferably, but not necessarily includes a visual format. The visual format may include a video format, a text format and/or an image format.

Alternatively, the second media items may have an audio format.

Alternatively, any one of the second media items may have either an audio format or media format other than audio. The media format other than audio may advantageously include a visual format. The visual format may include a video format, a text format and/or an image format.

Again, a media segment of said number of media segments may be a portion of the first media item. Said portion of the first media item may be a single point in time or, alternatively, may have a duration time (i.e., length in time).

In some embodiments, the media segment identifier may advantageously include a time code. The time code may include at least one of a starting time and an ending time. The starting time being may be indicative of a time position where the media segment starts. Likewise, the ending time may be indicative of a time position where the media segment ends.

It is also possible that a plurality of media segments of the number of media segments may overlap each other.

In some embodiments, the at least one memory 316B may further comprise instructions executable by the at least one processor 316A whereby the computer server system 300 is operative to provide the selected one or more second media items media item to the media device while the first media item is being streamed to the media device.

In some embodiments, the at least one memory 316B may further comprise instructions executable by the at least one processor 316A whereby the computer server system 300 is operative to provide any one of said second media items to the media device exclusively upon receiving an instruction from the media device to provide the second media item. In some embodiments, the instruction from the media device may comprise a media segment identifier (e.g., time code) of a selected media segment of the first media item.

In some embodiments, the at least one memory 316B may also comprise instructions executable by the at least one processor 316A whereby the computer server system 300 is operative to obtain location information indicative of a location of the media device, and to select the one or more second media items to be associated with a respective media segment of the first media item in dependence of the obtained location information. Said location information may for example be further indicative of a location of the media device at a point in time when the first media item is being played by the media device. In some embodiments, the at least one memory 316B may comprise instructions executable by the at least one processor 316A whereby the computer server system 300 is operative to: i) receive a data message from the media device via the communications interface 316C, wherein said data message comprises the earlier-mentioned location information; and retrieve the location information from the thus received data message.

In some embodiments, the at least one memory 316B may comprise instructions executable by the at least one processor 316A whereby the computer server system is operative to receive, e.g. via the communications interface 316C, an instruction from the media device to return one or more second media items associated with a selected media segment(s) of the first media item (e.g., a first media item that is being played). The instruction may comprise the media segment identifier(s) (e.g., the time code) of the selected media segment(s) of the first media item. In one embodiment, the at least one memory 316B may additionally comprise instructions executable by the at least one processor 316A whereby the computer server system 300 is operative to: retrieve said media segment identifier(s) of the selected media segment(s) of the first media item; identify the selected media segment(s) utilizing the retrieved media segment identifier(s); select the one or more second media items to be associated with the thus identified media segment(s); and associate the selected one or more second media items with the identified media segment(s).

Figure 8:
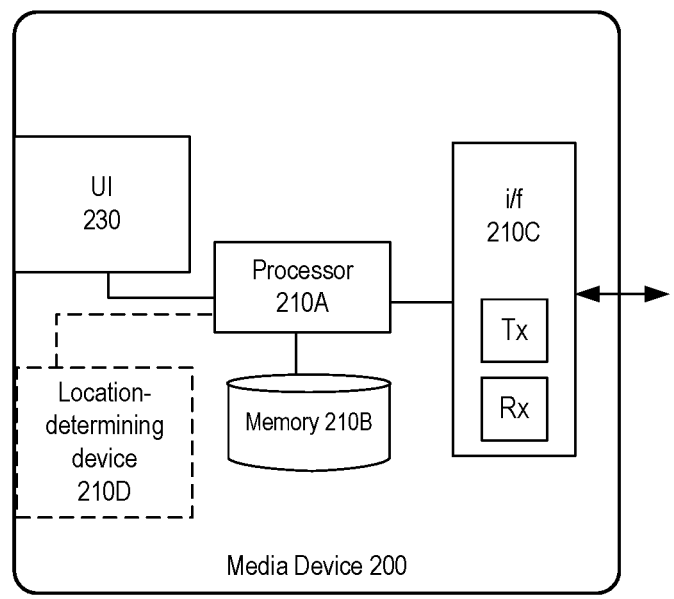
FIG. 8 illustrates an example implementation of an embodiment of a media device in FIG. 1.

With reference to FIG. 8, an example implementation of the media device 200 of FIG. 1 will be described in some further detail. The media device 200 shown in FIG. 8 is configured to execute, or otherwise perform, the methods described throughout this disclosure e.g. those described with reference to FIG. 3. FIG. 8 illustrates an example implementation of the media device 200. Again, the media device 200 may be a portable communication device (e.g., a cellular telephone, a smart phone, a tablet computer, or the like). The media device 200 is configured to execute, or otherwise perform, the method described with respect to FIG. 4. As is schematically illustrated in FIG. 8, the media device 200 comprises hardware resources 210A-E. For example, the media device 200 may comprise one or more processors 210A and one or more memories 210B. Also, a communications interface 210C may be provided in order to allow the media device 200 to communicate with other media devices and/or computer server systems 300, e.g. via a network 400 such as the Internet. To this end, the communications interface 210C may comprise a transmitter (Tx) and a receiver (Rx). Alternatively, the communications interface 210C may comprise a transceiver (Tx/Rx) combining both transmission and reception capabilities. The communications interface 210C may include a radio frequency (RF) interface allowing the media device 200 to communicate with other devices and/or computer server systems 300 through a radio frequency band through the use of different radio frequency technologies such as 5G New Radio, LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. The media device 200 may further comprise a user interface 230, as described earlier herein. The user interface 230 may advantageously include a touch-sensitive display. As such, the touch-sensitive display may be a touch screen display upon which virtual keys may be displayed and operated. Furthermore, the user interface 230 may include output means such as loudspeakers (not shown). Also, the media device may optionally comprise a location-determining device 210D, such as a positioning device (e.g. a GPS device) for determining a position and hence the location of the media device 200. Furthermore, the media device 200 may comprise a timer (not shown) or timer functionality. Still further, an audio recording device (not shown) such as a microphone may be provided for recording audio. Also, and as described with reference to FIG. 1, the media device 200 may comprise one or more applications, e.g. the media playback application 220. The applications may include sets of instructions (e.g., computer program code) that when executed by the one or more processors 210A controls the operation of the media device 200.

In the example implementation shown in FIG. 8, the at least one memory 210B comprises instructions executable by the at least one processor 210A whereby the media device 200 is operative to: i) receive, via the UI 230 of the media device 200, a first request to play a second media item simultaneously, the second media item being associated with the first media item and being of any media format; ii) in response to receiving said first request, provide an instruction to a computer server system to return a second media item associated with a selected media segment of the first media item that is being played; and iii) receive, via the at least one communications interface 210C, said second media item from the computer server system; and iv) in response thereto, play or otherwise present said second media item.

In some embodiments, the at least one memory 210B may comprise instructions executable by the at least one processor 210A whereby the media device 200 is operative to play the first media item; and wherein i), ii), iii) and iv) described above are performed while the first media item is being played.

In some embodiments, the second media items may have a media format other than audio. The media format other than audio may include a visual format. The visual format may include a video format, a text format and/or an image format.

Alternatively, the second media items may have an audio format.

Alternatively, any one of the second media items may have either an audio format or media format other than audio. If so, the media format other than audio may include a visual format. The visual format may include a video format, a text format and/or an image format.

In some embodiments, the instruction may comprise a media segment identifier of the selected media segment of the first media item.

In some embodiments, the media segment identifier may advantageously include a time code. The time code may include at least one of a starting time and an ending time. For example, the starting time may be indicative of a time position where the media segment starts. Similarly, the ending time may be indicative of a time position where the media segment ends.

In some embodiments, the at least one memory 210B may additionally comprise instructions executable by the at least one processor 210A whereby the media device 200 is operative to: sense a location of the media device (e.g. by means of location-determining device 210D); determine location information based on the sensed location (e.g. by means of the location-determining device 210D); and communicate (e.g. utilizing communications interface 210C) the determined location information to the computer server system. In one embodiment, the at least one memory 210B may also comprise instructions executable by the at least one processor 210A whereby the media device 200 is operative to: generate a data message to include the determined location information into the data message; and communicate (e.g. utilizing communications interface 210C) the generated data message to the computer server system. In some embodiments the location information includes position coordinates of the media device.

The various aspects and embodiments described hitherto may allow for a novel user experience, which is primarily focusing on media having an audio format—i.e., audio. At the same time, some embodiments described herein enable the consumption of other media content (e.g., visual media content such as video content) 'on demand' in an efficient manner. According to some embodiments, the provision of said visual media content is only performed 'on demand' or based on a user-initiated instructions. This has the advantage that audio content and video content do not necessarily have to be streamed concurrently from the computer server system to the media device. This way, bandwidth resources are not unnecessarily consumed in the media streaming environment. Furthermore, complex operations such as synchronizing audio content and visual content during streaming of both audio content and visual content can be avoided or at least reduced. This, in turn, also allows for an increasingly sustainable usage of bandwidth resources and other resources throughout the media streaming environment.

In the detailed description hereinabove, for purposes of explanation and not limitation, specific details are set forth in order to provide a thorough understanding of various aspects and embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

LIST OF NUMBERED EXAMPLE EMBODIMENTS (NEE'S)

In view of the embodiments described hitherto, the technology disclosed herein thus encompasses the following non-limiting numbered example embodiments:

NEE1. A method of streaming a first media item having an audio format to a media device, the method being performed by a computer server system including one or more computer servers and comprising:
dividing the first media item into a number of media segments, wherein each one of the number of media segments is identifiable by a media segment identifier;
selecting one or more second media items to be associated with a respective media segment of the first media item, the second media items having any media format;
associating the selected one or more second media items with respective media segments of the first media segment; and
providing the selected one or more second media items media item to the media device.

NEE2. The method according to embodiment NEE1, wherein the second media items have a media format other than audio.

NEE3. The method according to embodiment NEE2, wherein the media format other than audio includes a visual format.

NEE4. The method according to embodiment NEE3, wherein the visual format includes a video format, a text format and/or an image format.

NEE5. The method according to embodiment NEE1, wherein the second media items have an audio format.

NEE6. The method according to embodiment NEE1, wherein any one of the second media items has either an audio format or media format other than audio.

NEE7. The method according to embodiment NEE6, wherein the media format other than audio includes a visual format.

NEE8. The method according to embodiment NEE7, wherein the visual format includes a video format, a text format and/or an image format.

NEE9. The method according to any one of the embodiments NEE1-NEE8, wherein a media segment of said number of media segments is a portion of the first media item.

NEE10. The method according to embodiment NEE9, wherein said portion of the first media item is a single point in time or, alternatively, has a duration time.

NEE11. The method according to any one of the embodiments NEE1, NEE9 or NEE10, wherein the media segment identifier includes a time code.

NEE12. The method according to NEE11, wherein the time code includes at least one of a starting time and an ending time, the starting time being indicative of a time position where the media segment starts and the ending time being indicative of a time position where the media segment ends.

NEE13. The method according to any one of the embodiments NEE1 or NEE9-NEE12, wherein a plurality of media segments of the number of media segments are overlapping each other.

NEE14. The method according to any one of the embodiments NEE1-NEE13, wherein providing the selected one or more second media items to the media device occurs while the first media item is being streamed to the media device.

NEE15. The method according to any one of the embodiments NEE1-NEE14, wherein any one of said second media items is provided to the media device exclusively upon receiving an instruction from the media device to provide the second media item.

NEE16. The method according to embodiment NEE15, wherein the instruction from the media device comprises a media segment identifier (e.g., time code) of a selected media segment of the first media item.

NEE17. The method according to any one of the embodiments NEE1-NEE16, further comprising obtaining location information indicative of a location of the media device, and wherein the selecting of one or more second media items to be associated with a respective media segment of the first media item is performed in dependence of the obtained location information.

NEE18. The method according to embodiment NEE17, wherein said location information is further indicative of a location of the media device at a point in time when the first media item is being played by the media device.

NEE19. The method according to embodiment NEE17 or NEE18, further comprising:
receiving a data message from the media device, the data message comprising the location information; and wherein
obtaining the location information includes retrieving the location information from the received data message.

NEE20. The method according to any one of the embodiments NEE1-NEE19, further comprising:
receiving an instruction from the media device to return one or more second media items associated with a selected media segment(s) of the first media item (e.g., a first media item that is being played).

NEE21. The method according to embodiment NEE20, wherein the instruction comprises the media segment identifier(s) (e.g., the time code) of the selected media segment(s) of the first media item.

NEE22. The method according to embodiment NEE21, further comprising:
retrieving said media segment identifier(s) of the selected media segment(s) of the first media item;

identifying the selected media segment(s) utilizing the retrieved media segment identifier(s); wherein the selecting of one or more second media items to be associated with a respective media segment of the first media item includes selecting the one or more second media items to be associated with the thus identified media segment(s); and wherein the associating of the selected one or more second media items with respective media segments of the first media segment includes associating the selected one or more second media items with the identified media segment(s).

NEE23. Computer program, comprising instructions which, when executed on at least one processor, cause the at least one processor to carry out the method according to any one of the embodiments NEE1-NEE22.

NEE24. A carrier comprising the computer program according to embodiment NEE23, wherein the carrier is any one of the following: an electronic signal, an optical signal, a radio signal or computer-readable storage medium.

NEE25. A computer server system, comprising:
at least one communications interface for communicating data messages to/from the computer server system;
at least one processor; and
at least one memory comprising instructions which, when executed on the at least one processor, cause the at least one processor to carry out the method according to any one of the embodiments NEE1-NEE22.

NEE26. A computer server system for streaming a first media item having an audio format to a media device, the computer server system comprising:
at least one communications interface for communication;
at least one processor; and
at least one memory comprising instructions executable by the at least one processor whereby the computer server system is operative to:
 divide the first media item into a number of media segments, wherein each one of the number of media segments is identifiable by a media segment identifier;
 select one or more second media items to be associated with a respective media segment of the first media item, the second media items having any media format;
 associate the selected one or more second media items with respective media segments of the first media segment; and
 provide the selected one or more second media items media item to the media device.

NEE27. The computer server system according to embodiment NEE26, wherein the second media items have a media format other than audio.

NEE28. The computer server system according to embodiment NEE27, wherein the media format other than audio includes a visual format.

NEE29. The computer server system according to embodiment NEE28, wherein the visual format includes a video format, a text format and/or an image format.

NEE30. The computer server system according to embodiment NEE26, wherein the second media items have an audio format.

NEE31. The computer server system according to embodiment NEE26, wherein any one of the second media items has either an audio format or media format other than audio.

NEE32. The computer server system according to embodiment NEE31, wherein the media format other than audio includes a visual format.

NEE33. The computer server system according to embodiment NEE32, wherein the visual format includes a video format, a text format and/or an image format.

NEE34. The computer server system according to any one of the embodiments NEE26-NEE33, wherein a media segment of said number of media segments is a portion of the first media item.

NEE35. The computer server system according to embodiment NEE34, wherein said portion of the first media item is a single point in time or, alternatively, has a duration time.

NEE36. The computer server system according to any one of the embodiments NEE26, NEE34 or NEE35, wherein the media segment identifier includes a time code.

NEE37. The computer server system according to NEE36, wherein the time code includes at least one of a starting time and an ending time, the starting time being indicative of a time position where the media segment starts and the ending time being indicative of a time position where the media segment ends.

NEE38. The computer server system according to any one of the embodiments NEE26 or NEE34-NEE37, wherein a plurality of media segments of the number of media segments are overlapping each other.

NEE39. The computer server system according to any one of the embodiments NEE26-NEE38, wherein the at least one memory comprises instructions executable by the at least one processor whereby the computer server system is operative to provide the selected one or more second media items media item to the media device while the first media item is being streamed to the media device.

NEE40. The computer server system according to any one of the embodiments NEE26-NEE39, wherein the at least one memory comprises instructions executable by the at least one processor whereby the computer server system is operative to provide any one of said second media items to the media device exclusively upon receiving an instruction from the media device to provide the second media item.

NEE41. The computer server system according to embodiment NEE40, wherein the instruction from the media device comprises a media segment identifier (e.g., time code) of a selected media segment of the first media item.

NEE42. The computer server system according to any one of the embodiments NEE26-NEE41, wherein the at least one memory comprises instructions executable by the at least one processor whereby the computer server system is operative to obtain location information indicative of a location of the media device, and to select the one or more second media items to be associated with a respective media segment of the first media item in dependence of the obtained location information.

NEE43. The computer server system according to embodiment NEE42, wherein said location information is further indicative of a location of the media device at a point in time when the first media item is being played by the media device.

NEE44. The computer server system according to embodiment NEE42 or NEE43, wherein the at least one memory comprises instructions executable by the at least one processor whereby the computer server system is operative to:
receive a data message from the media device via the communications interface, the data message comprising the location information; and
retrieve the location information from the received data message.

NEE45. The computer server system according to any one of the embodiments NEE26-NEE44, wherein the at least one memory comprises instructions executable by the at least one processor whereby the computer server system is operative to:

receive, via the communications interface, an instruction from the media device to return one or more second media items associated with a selected media segment(s) of the first media item (e.g., a first media item that is being played).

NEE46. The computer server system according to embodiment NEE45, wherein the instruction comprises the media segment identifier(s) (e.g., the time code) of the selected media segment(s) of the first media item.

NEE47. The computer server system according to embodiment NEE46, wherein the at least one memory comprises instructions executable by the at least one processor whereby the computer server system is operative to:

retrieve said media segment identifier(s) of the selected media segment(s) of the first media item;

identify the selected media segment(s) utilizing the retrieved media segment identifier(s);

select the one or more second media items to be associated with the thus identified media segment(s); and associate the selected one or more second media items with the identified media segment(s).

NEE48. A method performed by a media device for playback of a streamed first media item having an audio format, the method comprising:

receiving, via a user interface of the media device, a first request to play a second media item simultaneously, the second media item being associated with the first media item and being of any media format;

in response to receiving said first request, providing an instruction to a computer server system to return a second media item associated with a selected media segment of the first media item; and receiving said second media item from the computer server system; and in response thereto, play or otherwise present said second media item.

NEE49. The method according to embodiment NEE48, further comprising playing the first media item; and wherein the actions or method steps of embodiment NEE48 are performed while the first media item is being played.

NEE50. The method according to embodiment NEE48 or NEE49, wherein the second media items have a media format other than audio.

NEE51. The method according to embodiment NEE50, wherein the media format other than audio includes a visual format.

NEE52. The method according to embodiment NEE51, wherein the visual format includes a video format, a text format and/or an image format.

NEE53. The method according to embodiment NEE48 or NEE49, wherein the second media items have an audio format.

NEE54. The method according to embodiment NEE48 or NEE49, wherein any one of the second media items has either an audio format or media format other than audio.

NEE55. The method according to embodiment NEE54, wherein the media format other than audio includes a visual format.

NEE56. The method according to embodiment NEE55, wherein the visual format includes a video format, a text format and/or an image format.

NEE57. The method according to any one of the embodiments NEE48-NEE56, wherein the instruction comprises a media segment identifier of the selected media segment of the first media item.

NEE58. The method according to embodiment NEE57, wherein the media segment identifier includes a time code.

NEE59. The method according to NEE58, wherein the time code includes at least one of a starting time and an ending time, the starting time being indicative of a time position where the media segment starts and the ending time being indicative of a time position where the media segment ends.

NEE60. The method according to any one of the embodiments NEE48-NEE59, further comprising:

sensing a location of the media device;

determining location information based on the sensed location; and communicating the determined location information to the computer server system.

NEE61. The method according to embodiment NEE60, further comprising generating a data message to include the determined location information into the data message; wherein communicating the determined location information to the computer server system comprises communicating the generated data message to the computer server system.

NEE62. The method according to embodiment NEE60 or NEE61, wherein the location information includes position coordinates of the media device.

NEE63. Computer program, comprising instructions which, when executed on at least one processor, cause the at least one processor to carry out the method according to any one of the embodiments NEE48-NEE62.

NEE64. A carrier comprising the computer program according to embodiment NEE63, wherein the carrier is any one of the following: an electronic signal, an optical signal, a radio signal or computer-readable storage medium.

NEE65. A media device, comprising:

a user interface;

at least one communications interface for communicating data messages to/from the media device;

at least one processor; and at least one memory comprising instructions which, when executed on the at least one processor, cause the at least one processor to carry out the method according to any one of the claims NEE48-NEE62.

NEE66. A media device, the media device comprising:

a user interface;

at least one communications interface for communicating data messages to/from the media device;

at least one processor; and at least one memory comprising instructions executable by the at least one processor whereby the media device is operative to:

i) receive, via the user interface of the media device, a first request to play a second media item simultaneously, the second media item being associated with the first media item and being of any media format;

ii) in response to receiving said first request, provide an instruction to a computer server system to return a second media item associated with a selected media segment of the first media item that is being played; and iii) receive, via the at least one communications interface, said second media item from the computer server system; and iv) in response thereto, play or otherwise present said second media item.

NEE67. The media device according to embodiment NEE66, wherein the at least one memory comprises instructions executable by the at least one processor whereby the media device is operative to play the first media item; and wherein i), ii), iii) and iv) of embodiment NEE66 are performed while the first media item is being played.

NEE68. The media device according to embodiment NEE66 or NEE67, wherein the second media items have a media format other than audio.

NEE69. The media device according to embodiment NEE68, wherein the media format other than audio includes a visual format.

NEE70. The media device according to embodiment NEE69, wherein the visual format includes a video format, a text format and/or an image format.

NEE71. The media device according to embodiment NEE66 or NEE67, wherein the second media items have an audio format.

NEE72. The media device according to embodiment NEE66 or NEE67, wherein any one of the second media items has either an audio format or media format other than audio.

NEE73. The media device according to embodiment NEE72, wherein the media format other than audio includes a visual format.

NEE74. The media device according to embodiment NEE73, wherein the visual format includes a video format, a text format and/or an image format.

NEE75. The media device according to any one of the embodiments NEE66-NEE74, wherein the instruction comprises a media segment identifier of the selected media segment of the first media item.

NEE76. The media device according to embodiment NEE75, wherein the media segment identifier includes a time code.

NEE77. The media device according to NEE76, wherein the time code includes at least one of a starting time and an ending time, the starting time being indicative of a time position where the media segment starts and the ending time being indicative of a time position where the media segment ends.

NEE78. The media device according to any one of the embodiments NEE66-NEE77, wherein the at least one memory comprises instructions executable by the at least one processor whereby the media device is operative to:
sense a location of the media device;
determine location information based on the sensed location; and
communicate the determined location information to the computer server system.

NEE79. The media device according to embodiment NEE78, wherein the at least one memory comprises instructions executable by the at least one processor whereby the media device is operative to: generate a data message to include the determined location information into the data message; and communicate the generated data message to the computer server system.

NEE80. The media device according to embodiment NEE78 or NEE79, wherein the location information includes position coordinates of the media device.

NEE81. The media device according to any one of the embodiments NEE65-NEE80, wherein the media device is a portable communication device.

NEE82. The media device according to embodiment NEE81, wherein portable communication device is a mobile telephone.

NEE83. The media device according to embodiment NEE81, wherein portable communication device is a tablet computer.

NEE84. The media device according to embodiment NEE81, wherein portable communication device is a laptop computer.

NEE85. The media device according to any one of the embodiments NEE65-NEE80, wherein the media device is a stationary communication device.

NEE86. The media device according to embodiment NEE85, wherein the media device is a stationary communication.

NEE87. A first media item for streaming from a computer server system including one or more computer servers to a media device, the first media item having an audio format and wherein the first media item comprises a number of media segments, wherein each one of the number of media segments is identifiable by a media segment identifier, and wherein at least one of the number of media segments is associated with a respective second media item corresponding to a respective media segment identifier, the second media item having any media format.

NEE88. The first media item according to embodiment NEE87, wherein said at least one of the number of media segments is associated with a respective second media item corresponding to a respective media segment identifier, the second media item having a media format other than audio.

NEE89. The first media item according to embodiment NEE88, wherein the media format other than audio includes a visual format.

NEE90. The first media item according to embodiment NEE89, wherein the visual format includes a video format, a text format and/or an image format.

NEE91. The first media item according to embodiment NEE87, wherein said at least one of the number of media segments is associated with a respective second media item corresponding to a respective media segment identifier, the second media item having an audio format.

NEE92. The first media item according to embodiment NEE87, wherein said at least one of the number of media segments is associated with a respective second media item corresponding to a respective media segment identifier, the second media item having either an audio format or media format other than audio.

NEE93. The first media item according to embodiment NEE92, wherein the media format other than audio includes a visual format.

NEE94. The first media item according to embodiment NEE93, wherein the visual format includes a video format, a text format and/or an image format.

NEE95. The first media item according to any one of the embodiments NEE87-NEE94, wherein a media segment of said number of media segments is a portion of the first media item.

NEE96. The first media item according to embodiment NEE95, wherein said portion of the first media item is a single point in time or, alternatively, has a duration time.

NEE97. The first media item according to any one of the embodiments NEE87, NEE95 or NEE96, wherein the media segment identifier includes a time code.

NEE98. The first media item according to NEE97, wherein the time code includes at least one of a starting time and an ending time, the starting time being indicative of a time position where the media segment starts and the ending time being indicative of a time position where the media segment ends.

NEE99. The first media item according to any one of the embodiments NEE87 or NEE95-NEE98, wherein a plurality of media segments of the number of media segments are overlapping each other.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method, comprising:
at a computer server system including one or more computer servers:
dividing a first media item having an audio format into a number of media segments, wherein a respective media segment is associated with a respective media segment identifier;
associating one or more textual media items with respective media segments of the first media item;
receiving an instruction, including a media segment identifier, from a media device to provide a textual media item; and
in response to receiving the instruction, providing the first media item and a textual media item associated with the media segment identifier to the media device.

2. The method according to claim 1, wherein the textual media item associated with the media segment identifier comprises lyrics.

3. The method according to claim 1, wherein the media segment identifier includes a time code.

4. The method according to claim 1, wherein providing the textual media item to the media device occurs while the first media item is being streamed to the media device.

5. The method according to claim 4, further comprising providing the textual media item and one or more second media items associated with the media item segment upon receiving the instruction from the media device, the one or more second media items having a media format other than audio.

6. The method according to claim 1, further comprising receiving location information of the media device, wherein the textual media item is selected based in part on the received location information.

7. The method according to claim 1, wherein:
the media segment identifier received in the instruction identifies a selected media segment of the first media item; and
the textual media item is associated with the selected media segment.

8. The method according to claim 1, wherein the instruction is generated at the media device in response to a user request received at a user interface of the media device.

9. A method performed by a media device for playback of a streamed first media item having an audio format, the method comprising:
playing the first media item; and
while the first media item is being played:
receiving, via a user interface of the media device, a first request to play a textual media item simultaneously, the textual media item being associated with the first media item;
in response to receiving said first request, providing an instruction to a computer server system to return a textual media item associated with a selected media segment of the first media item that is being played;
receiving said textual media item from the computer server system; and
in response thereto, playing or otherwise presenting the textual media item.

10. The method according to claim 9, wherein the instruction comprises a media segment identifier of the selected media segment of the first media item.

11. The method according to claim 9, wherein the media segment identifies includes a time code.

12. The method according to claim 9, further comprising receiving said textual media item and one or more second media items associated with the media item segment in response to providing the instruction to the computer server system, the one or more second media items having a media format other than audio.

13. The method according to claim 9, further comprising sending, to the computer server system, location information of the media device, wherein said textual media item is selected based in part on the received location information.

14. A computer server system, comprising:
at least one communications interface for communicating data messages to/from the computer server system;
at least one processor; and
at least one memory comprising instructions which, when executed on the at least one processor, cause the at least one processor to:
divide a first media item having an audio format into a number of media segments, wherein a respective media segment is associated with a respective media segment identifier;
associate one or more textual media items with respective media segments of the first media item;
receive an instruction, including a media segment identifier, from a media device to provide a textual media item; and
in response to receiving the instruction, provide the first media item and a textual media item associated with the media segment identifier to the media device.

15. A media device, comprising:
a user interface;
at least one communications interface for communicating data messages to/from the media device;
at least one processor; and
at least one memory comprising instructions which, when executed on the at least one processor, cause the at least one processor to:

play a first media item; and
while the first media item is being played:
- receive, via the user interface, a first request to play a textual media item simultaneously, the textual media item being associated with the first media item;
- in response to receiving said first request, provide an instruction to a computer server system to return a textual media item associated with a selected media segment of the first media item that is being played;
- receive said textual media item from the computer server system; and
- in response thereto, play or otherwise present the textual media item.

* * * * *

UNITED STATES PATENT AND TRADEMARK OFFICE
CERTIFICATE OF CORRECTION

PATENT NO. : 11,330,348 B2
APPLICATION NO. : 17/108812
DATED : May 10, 2022
INVENTOR(S) : Garmark et al.

It is certified that error appears in the above-identified patent and that said Letters Patent is hereby corrected as shown below:

In the Claims

Claim 11, Column 32, Line 24, delete "claim 9," and insert --claim 10,--.

Claim 11, Column 32, Line 25, delete "segment identifies includes" and insert --segment identifier includes--.

Signed and Sealed this
Second Day of August, 2022

Katherine Kelly Vidal
*Director of the United States Patent and Trademark Office*